(12) United States Patent
Rappas et al.

(10) Patent No.: US 8,734,547 B2
(45) Date of Patent: *May 27, 2014

(54) PROCESSES FOR PREPARING A CATALYZED CARBONACEOUS PARTICULATE

(75) Inventors: Alkis S. Rappas, Kingwood, TX (US); Robert A. Spitz, Abington, MA (US)

(73) Assignee: Greatpoint Energy, Inc., Cambridge, MA (US)

( * ) Notice: Subject to any disclaimer, the term of this patent is extended or adjusted under 35 U.S.C. 154(b) by 1153 days.

This patent is subject to a terminal disclaimer.

(21) Appl. No.: 12/648,469

(22) Filed: Dec. 29, 2009

(65) Prior Publication Data

US 2010/0168495 A1 Jul. 1, 2010

Related U.S. Application Data

(60) Provisional application No. 61/141,306, filed on Dec. 30, 2008.

(51) Int. Cl.
*B01J 23/04* (2006.01)
*C07C 4/00* (2006.01)

(52) U.S. Cl.
USPC ........... 48/127.7; 48/197 R; 48/210; 585/701; 585/704; 585/733; 423/437.1; 241/23

(58) Field of Classification Search
None
See application file for complete search history.

(56) References Cited

U.S. PATENT DOCUMENTS

| | | | |
|---|---|---|---|
| 2,605,215 A | 7/1952 | Coghlan | |
| 2,694,623 A | 11/1954 | Welty, Jr. et al. | |
| 2,791,549 A | 5/1957 | Jahnig | |
| 2,813,126 A | 11/1957 | Tierney | |
| 2,860,959 A | 11/1958 | Pettyjohn et al. | |
| 2,886,405 A | 5/1959 | Benson et al. | |
| 3,034,848 A | 5/1962 | King | |
| 3,114,930 A | 12/1963 | Oldham et al. | |
| 3,150,716 A | 9/1964 | Strelzoff et al. | |
| 3,164,330 A | 1/1965 | Neidl | |
| 3,351,563 A | 11/1967 | Negra et al. | |
| 3,435,590 A | 4/1969 | Smith | |
| 3,531,917 A | 10/1970 | Grunewald et al. | |
| 3,544,291 A | 12/1970 | Schlinger et al. | |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

Hydromethanation Process, GreatPoint Energy, Inc., from World Wide Web <http://greatpointenergy.com/ourtechnology.php.> accessed Sep. 5, 2013.

(Continued)

*Primary Examiner* — Jill Warden
*Assistant Examiner* — Julie Tavares
(74) *Attorney, Agent, or Firm* — McDonnell Boehnen Hulbert & Berghoff LLP (57) ABSTRACT

Processes are provided for preparing a substantially free-flowing alkali metal gasification catalyst-loaded carbonaceous particulate suitable for use as a feedstock for the production of gaseous products, and in particular methane, via the catalytic gasification of the catalyst-loaded carbonaceous particulate in the presence of steam.

11 Claims, 1 Drawing Sheet

(56) References Cited

U.S. PATENT DOCUMENTS

| | | |
|---|---|---|
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |

(56) References Cited

U.S. PATENT DOCUMENTS

| | | | |
|---|---|---|---|
| 4,861,360 A | 8/1989 | Apffel | |
| 4,872,886 A | 10/1989 | Henley et al. | |
| 4,876,080 A | 10/1989 | Paulson | |
| 4,892,567 A | 1/1990 | Yan | |
| 4,960,450 A | 10/1990 | Schwarz et al. | |
| 4,995,193 A | 2/1991 | Soga et al. | |
| 5,017,282 A | 5/1991 | Delbianco et al. | |
| 5,055,181 A | 10/1991 | Maa et al. | |
| 5,057,294 A | 10/1991 | Sheth et al. | |
| 5,059,406 A | 10/1991 | Sheth et al. | |
| 5,074,357 A | 12/1991 | Haines | |
| 5,093,094 A | 3/1992 | Van Kleeck et al. | |
| 5,094,737 A | 3/1992 | Bearden, Jr. et al. | |
| 5,132,007 A | 7/1992 | Meyer et al. | |
| 5,223,173 A | 6/1993 | Jeffrey | |
| 5,225,044 A | 7/1993 | Breu | |
| 5,236,557 A | 8/1993 | Muller et al. | |
| 5,250,083 A | 10/1993 | Wolfenbarger et al. | |
| 5,277,884 A | 1/1994 | Shinnar et al. | |
| 5,388,645 A | 2/1995 | Puri et al. | |
| 5,388,650 A | 2/1995 | Michael | |
| 5,435,940 A | 7/1995 | Doering et al. | |
| 5,536,893 A | 7/1996 | Gudmundsson | |
| 5,566,755 A | 10/1996 | Seidle et al. | |
| 5,616,154 A | 4/1997 | Elliott et al. | |
| 5,630,854 A | 5/1997 | Sealock, Jr. et al. | |
| 5,641,327 A | 6/1997 | Leas | |
| 5,660,807 A | 8/1997 | Forg et al. | |
| 5,669,960 A | 9/1997 | Couche | |
| 5,670,122 A | 9/1997 | Zamansky et al. | |
| 5,720,785 A | 2/1998 | Baker | |
| 5,733,515 A | 3/1998 | Doughty et al. | |
| 5,769,165 A | 6/1998 | Bross et al. | |
| 5,776,212 A | 7/1998 | Leas | |
| 5,788,724 A | 8/1998 | Carugati et al. | |
| 5,855,631 A | 1/1999 | Leas | |
| 5,865,898 A | 2/1999 | Holtzapple et al. | |
| 5,968,465 A | 10/1999 | Koveal et al. | |
| 6,013,158 A | 1/2000 | Wootten | |
| 6,015,104 A | 1/2000 | Rich, Jr. | |
| 6,028,234 A | 2/2000 | Heinemann et al. | |
| 6,032,737 A | 3/2000 | Brady et al. | |
| 6,090,356 A | 7/2000 | Jahnke et al. | |
| 6,119,778 A | 9/2000 | Seidle et al. | |
| 6,132,478 A | 10/2000 | Tsurui et al. | |
| 6,180,843 B1 | 1/2001 | Heinemann et al. | |
| 6,187,465 B1 | 2/2001 | Galloway | |
| 6,379,645 B1 | 4/2002 | Bucci et al. | |
| 6,389,820 B1 | 5/2002 | Rogers et al. | |
| 6,419,888 B1 | 7/2002 | Wyckoff | |
| 6,506,349 B1 | 1/2003 | Khanmamedov | |
| 6,506,361 B1 | 1/2003 | Machado et al. | |
| 6,602,326 B2 | 8/2003 | Lee et al. | |
| 6,641,625 B1 | 11/2003 | Clawson et al. | |
| 6,653,516 B1 | 11/2003 | Yoshikawa et al. | |
| 6,692,711 B1 | 2/2004 | Alexion et al. | |
| 6,790,430 B1 | 9/2004 | Lackner et al. | |
| 6,797,253 B2 | 9/2004 | Lyon | |
| 6,808,543 B2 | 10/2004 | Paisley | |
| 6,830,597 B1 | 12/2004 | Green | |
| 6,855,852 B1 | 2/2005 | Jackson et al. | |
| 6,878,358 B2 | 4/2005 | Vosteen et al. | |
| 6,894,183 B2 | 5/2005 | Choudhary et al. | |
| 6,955,595 B2 | 10/2005 | Kim | |
| 6,955,695 B2 | 10/2005 | Nahas | |
| 6,969,494 B2 | 11/2005 | Herbst | |
| 7,074,373 B1 | 7/2006 | Warren et al. | |
| 7,077,202 B2 | 7/2006 | Shaw et al. | |
| 7,100,692 B2 | 9/2006 | Parsley et al. | |
| 7,118,720 B1 | 10/2006 | Mendelsohn et al. | |
| 7,132,183 B2 | 11/2006 | Galloway | |
| 7,168,488 B2 | 1/2007 | Olsvik et al. | |
| 7,205,448 B2 | 4/2007 | Gajda et al. | |
| 7,220,502 B2 | 5/2007 | Galloway | |
| 7,299,868 B2 | 11/2007 | Zapadinski | |
| 7,309,383 B2 | 12/2007 | Beech, Jr. et al. | |
| 7,481,275 B2 | 1/2009 | Olsvik et al. | |
| 7,666,383 B2 | 2/2010 | Green | |
| 7,677,309 B2 | 3/2010 | Shaw et al. | |
| 7,758,663 B2 | 7/2010 | Rabovitser et al. | |
| 7,897,126 B2 | 3/2011 | Rappas et al. | |
| 7,901,644 B2 | 3/2011 | Rappas et al. | |
| 7,922,782 B2 | 4/2011 | Sheth | |
| 7,926,750 B2 | 4/2011 | Hauserman | |
| 7,976,593 B2 | 7/2011 | Graham | |
| 8,114,176 B2 | 2/2012 | Nahas | |
| 8,114,177 B2 | 2/2012 | Hippo et al. | |
| 8,123,827 B2 | 2/2012 | Robinson | |
| 8,163,048 B2 * | 4/2012 | Rappas et al. | 48/210 |
| 8,192,716 B2 | 6/2012 | Raman et al. | |
| 8,202,913 B2 | 6/2012 | Robinson et al. | |
| 8,268,899 B2 | 9/2012 | Robinson et al. | |
| 8,286,901 B2 | 10/2012 | Rappas et al. | |
| 8,297,542 B2 | 10/2012 | Rappas et al. | |
| 8,328,890 B2 | 12/2012 | Reiling et al. | |
| 8,349,037 B2 | 1/2013 | Steiner et al. | |
| 8,349,039 B2 | 1/2013 | Robinson | |
| 8,361,428 B2 | 1/2013 | Raman et al. | |
| 8,366,795 B2 | 2/2013 | Raman et al. | |
| 8,479,833 B2 | 7/2013 | Raman | |
| 8,479,834 B2 | 7/2013 | Preston | |
| 8,502,007 B2 | 8/2013 | Hippo et al. | |
| 2002/0036086 A1 | 3/2002 | Minkkinen et al. | |
| 2003/0070808 A1 | 4/2003 | Allison | |
| 2003/0131582 A1 | 7/2003 | Anderson et al. | |
| 2003/0167691 A1 | 9/2003 | Nahas | |
| 2004/0020123 A1 | 2/2004 | Kimura et al. | |
| 2004/0023086 A1 | 2/2004 | Su et al. | |
| 2004/0123601 A1 | 7/2004 | Fan | |
| 2004/0180971 A1 | 9/2004 | Inoue et al. | |
| 2004/0256116 A1 | 12/2004 | Olsvik et al. | |
| 2005/0107648 A1 | 5/2005 | Kimura et al. | |
| 2005/0137442 A1 | 6/2005 | Gajda et al. | |
| 2005/0192362 A1 | 9/2005 | Rodriguez et al. | |
| 2005/0287056 A1 | 12/2005 | Baker et al. | |
| 2005/0288537 A1 | 12/2005 | Maund et al. | |
| 2006/0149423 A1 | 7/2006 | Barnicki et al. | |
| 2006/0228290 A1 | 10/2006 | Green | |
| 2006/0231252 A1 | 10/2006 | Shaw et al. | |
| 2006/0265953 A1 | 11/2006 | Hobbs | |
| 2006/0272813 A1 | 12/2006 | Olsvik et al. | |
| 2007/0000177 A1 | 1/2007 | Hippo et al. | |
| 2007/0051043 A1 | 3/2007 | Schingnitz | |
| 2007/0083072 A1 | 4/2007 | Nahas | |
| 2007/0180990 A1 | 8/2007 | Downs et al. | |
| 2007/0186472 A1 | 8/2007 | Rabovitser et al. | |
| 2007/0220810 A1 | 9/2007 | Leveson et al. | |
| 2007/0227729 A1 | 10/2007 | Zubrin et al. | |
| 2007/0237696 A1 | 10/2007 | Payton | |
| 2007/0277437 A1 | 12/2007 | Sheth | |
| 2007/0282018 A1 | 12/2007 | Jenkins | |
| 2008/0141591 A1 | 6/2008 | Kohl | |
| 2008/0289822 A1 | 11/2008 | Betzer Tsilevich | |
| 2009/0012188 A1 | 1/2009 | Rojey et al. | |
| 2009/0048476 A1 | 2/2009 | Rappas et al. | |
| 2009/0090055 A1 | 4/2009 | Ohtsuka | |
| 2009/0090056 A1 | 4/2009 | Ohtsuka | |
| 2009/0165361 A1 | 7/2009 | Rappas et al. | |
| 2009/0165376 A1 | 7/2009 | Lau et al. | |
| 2009/0165379 A1 * | 7/2009 | Rappas | 48/127.7 |
| 2009/0165380 A1 | 7/2009 | Lau et al. | |
| 2009/0165381 A1 | 7/2009 | Robinson | |
| 2009/0165382 A1 | 7/2009 | Rappas et al. | |
| 2009/0165383 A1 | 7/2009 | Rappas et al. | |
| 2009/0165384 A1 | 7/2009 | Lau et al. | |
| 2009/0166588 A1 | 7/2009 | Spitz et al. | |
| 2009/0169448 A1 | 7/2009 | Rappas et al. | |
| 2009/0169449 A1 | 7/2009 | Rappas et al. | |
| 2009/0170968 A1 | 7/2009 | Nahas et al. | |
| 2009/0173079 A1 | 7/2009 | Wallace et al. | |
| 2009/0217575 A1 | 9/2009 | Raman et al. | |
| 2009/0217582 A1 | 9/2009 | May et al. | |
| 2009/0217584 A1 | 9/2009 | Raman et al. | |
| 2009/0217585 A1 | 9/2009 | Raman et al. | |

(56) References Cited

U.S. PATENT DOCUMENTS

| | | |
|---|---|---|
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |

(56) References Cited

FOREIGN PATENT DOCUMENTS

| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2010/132549 | 11/2010 |
| WO | WO 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034891 | 3/2011 |
| WO | WO 2011/034890 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | WO 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

Sigma-Aldrich "Particle Size Conversion Table" (2004); from World Wide Web <http://www.sigmaaldrich.com/chemistry/learning-center/technical-library/particle-size-conversion.printerview.html>.
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Fluidized Bed Gasifiers, http://www.energyproducts.com/fluidized_bed_gasifiers.htm, pp. 1-5.
Mengjie, et al., "A potential renewable energy resource development and utilization of biomass energy", http://www.fao.org.docrep/T4470E/t4470e0n.htm, pp. 1-8.
2.3 Types of gasifiers, http://www.fao.org/docrep/t0512e/T0512e0a.htm, pp. 1-6.
2.4 Gasification fuels, http://www.fao.org/docrep/t0512e/t0512e/T0512e0b.htm#TopofPage, pp. 1-8.
2.5 Design of downdraught gasifiers, http://www.foa.org/docrep/t0512e0c.htm#TopOfPage, pp. 1-8.
2.6 Gas cleaning and cooling, http://www.fao.org/docrep/t0512e0d.htm#TopOFPage, pp. 1-3.
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.
Brown et al., "Biomass-Derived Hydrogen From a thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
Coal Conversion Processes (Gasification), Encyclopedia of Chemical Technology, 4$^{th}$ Edition, vol. 6, pp. 541-566.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Gerdes, Kristin, et al., "Integrated Gasification Fuel Cell Performance and Cost Assessment," National Energy Technology Laboratory, U.S. Department of Energy, Mar. 27, 2009, pp. 1-26.
Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm pp. 1-5, 2007.
Gas separation, http://en.wikipedia.org/wiki/Gas_seperation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).

(56) References Cited

OTHER PUBLICATIONS

Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Mengjie, et al., "A potential renewable energy resource development and utilization of biomass energy", http://www.fao.org.docrep/T4470E/t4470e0n.htm, pp. 1-8, 1994.

Meyers, et al. Fly Ash as A Construction Material for Highways, A Manual. Federal Highway Administration, Report No. FHWA-IP-76-16, Washington, DC, 1976.

Coal Bottom Ash/Boiler Slag, http://www.p2pays.org/ref/13/12842/cbabs2.htm.

Natural gas processing, http://en.wikipedia.org/wiki/Natural_gas_processing, pp. 1-4.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Reboiler, http://en.wikipedia.org/wiki/Reboiler, pp. 1-4.

What is XPS?, http://www.nuance.northwestern.edu/Keckll/xps1.asp, pp. 1-2.

2.3 Types of gasifiers, http://www.fao.org/docrep/t0512e0a.htm, pp. 1-6, 1986.

2.4 Gasification fuels, http://www.fao.org/docrep/t0512e/T0512e0b.htm#TopofPage, pp. 1-8, 1986.

2.5 Design of downdraught gasifiers, http://www.fao.org/docrep/t0512e/T0512e0c.htm#TopOfPage, pp. 1-8, 1986.

2.6 Gas cleaning and cooling, http://www.fao.org/docrep/t0512e0d.htm#TopOFPage, pp. 1-3, 1986.

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From A Thermally Ballasted Gasifier," Aug. 2005.

Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.

Coal Conversion Processes (Gasification), Encyclopedia of Chemical Technology, $4^{th}$ Edition, vol. 6, pp. 541-566, 1993.

Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-012777, 1981.

Kalina, T., Nahas, N. C., Project Managers, "Exxon Catalaytic Coal Gasification Process Predevelopment Program," Exxon Research & Engineering Company, FE-2369-24, U.S. Dept. of Energy, Contract No., E(49-18)-2369, 1978.

Nahas, N. C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

"Integrate Gasification Combined Cycle (IGCC)," WorleyParsons Resources & Energy, http://www.worleyparsons.com/v5/page.aspx?id=164.

* cited by examiner

PROCESSES FOR PREPARING A CATALYZED CARBONACEOUS PARTICULATE

CROSS-REFERENCE TO RELATED APPLICATION

This application claims priority under 35 U.S.C. §119 from U.S. Provisional Application Ser. No. 61/141,306 (filed Dec. 30, 2008), the disclosure of which is incorporated by reference herein for all purposes as if fully set forth.

This application is related to commonly owned U.S. patent application Ser. No. 12/648,471 (concurrently filed herewith), entitled "PROCESSES FOR PREPARING A CATALYZED COAL PARTICULATE", the disclosure of which is incorporated by reference herein for all purposes as if fully set forth.

FIELD OF THE INVENTION

The present invention relates to processes for preparing a substantially free-flowing alkali metal gasification catalyst-loaded carbonaceous particulate suitable for use as a feedstock for the production of gaseous products, and in particular methane, via the catalytic gasification of the catalyst-loaded carbonaceous particulate in the presence of steam.

BACKGROUND OF THE INVENTION

In view of numerous factors such as higher energy prices and environmental concerns, the production of value-added gaseous products from lower-fuel-value carbonaceous feedstocks, such as petroleum coke and coal, is receiving renewed attention. The catalytic gasification of such materials to produce methane and other value-added gases is disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217584A1, US2009/0217585A1, US2009/0217590A1, US2009/0217586A1, US2009/0217588A1, US2009/0217589A1, US2009/0217575A1, US2009/0217587A1, US2009/0220406A1, US2009/0229182A1, US2009/0246120A1, US2009/0259080A1, US2009/0260287A1 and GB1599932.

In general, carbonaceous materials, such as coal or petroleum coke, can be converted to a plurality of gases, including value-added gases such as methane, by the gasification of the material in the presence of an alkali metal catalyst source and steam at elevated temperatures and pressures. Fine unreacted carbonaceous materials are removed from the raw gases produced by the gasifier, the gases are cooled and scrubbed in multiple processes to remove undesirable contaminants and other side-products including carbon monoxide, hydrogen, carbon dioxide, and hydrogen sulfide.

While it has been suggested to improve the gasification of carbonaceous materials by admixing the materials with a selected catalyst, or catalysts, techniques heretofore suggested have not been entirely successful. For example, known methods of impregnating such materials with catalyst include (a) spraying the carbonaceous material with a solution of the catalyst and (b) soaking the carbonaceous material in a solution of the catalyst. These methods of coal impregnation suffer the drawback of producing a material with catalyst loading that is not highly dispersed, and thus with reduced gasification efficiency. These known methods are also energy intensive, as significant heat must be added to the process at different steps for purposes such as moisture reduction.

Therefore, there exists a need in the art to provide more efficient processes for the loading of catalyst onto carbonaceous feedstocks so as to provide particulate compositions particularly adapted for the gasification of coal to methane.

SUMMARY OF THE INVENTION

In one aspect, the invention provides processes for preparing a substantially free-flowing alkali metal gasification catalyst-loaded carbonaceous particulate from a carbonaceous feedstock, the process comprising the steps of:

(A) providing a carbonaceous feedstock having an initial moisture content;

(B) grinding the carbonaceous feedstock;

(C) classifying the carbonaceous feedstock from step (B) to a specified particle size profile to produce a carbonaceous particulate;

(D) contacting the carbonaceous particulate with an amount of an aqueous solution comprising a concentration of an alkali metal gasification catalyst, to form an alkali metal gasification catalyst-loaded carbonaceous particulate wet cake having a specified ratio of alkali metal atoms to carbon atoms and a second moisture content; and (E) thermally treating the alkali metal gasification catalyst-loaded carbonaceous particulate wet cake as required to reduce the second moisture content to produce the alkali metal gasification catalyst-loaded carbonaceous particulate as a substantially free-flowing particulate, wherein:

(a) the specified particle size profile has a d5 particle size of at least about 20 microns, a d95 particle size of about 1000 microns or less, and a d50 particle size ranging from about 75 to about 350 microns;

(b) the specified ratio of alkali metal atoms to carbon atoms of step (D) is sufficient to provide an alkali metal atoms to carbon atoms ratio in the substantially free-flowing alkali metal gasification catalyst-loaded carbonaceous particulate of from about 0.01 to about 0.10;

(c) the amount of aqueous solution and the concentration of the alkali metal gasification catalyst in step (D) are sufficient to provide the specified ratio of alkali metal atoms to carbon atoms in the alkali metal gasification catalyst-loaded carbonaceous particulate wet cake, (d) the alkali metal gasification catalyst-loaded carbonaceous particulate wet cake resulting from step (D) is substantially non-draining;

(e) the contacting in step (D) takes place at substantially atmospheric pressure, and at an elevated temperature substantially at or below the boiling point of the aqueous solution, under agitation and for a specified amount of time, each of which is in an amount sufficient in combination to allow substantially even distribution of the alkali metal gasification catalyst within the non-draining alkali metal gasification catalyst-loaded carbonaceous particulate wet cake; and (f) the non-draining alkali metal gasification catalyst loaded carbonaceous particulate wet cake exits step (D) at a first temperature, and is passed into the thermal treating step (E) at substantially the same temperature.

Optionally, in step (B) the carbonaceous feedstock is dry ground. In such a case, the initial moisture content of the carbonaceous feedstock is optionally reduced so that, when taking into account the amount of aqueous solution used in step (D), the wet cake resulting from step (D) is substantially non-draining (does not require dewatering for step (E)).

Alternatively, in step (B) the carbonaceous feedstock is wet ground. In such a case, the moisture content of the resulting wet ground carbonaceous feedstock is reduced so that, when taking into account the amount of aqueous solution used in step (D), the wet cake resulting from step (D) is substantially non-draining (does not require dewatering for step (E)).

The present invention is also directed to a process for converting a particulate composition into a plurality of gaseous products comprising the steps of:

(a) supplying a particulate composition, prepared according to the present invention, to a gasifying reactor;

(b) reacting the particulate composition in the gasifying reactor in the presence of steam and under suitable temperature and pressure to form a plurality of gaseous including methane and at least one or more of hydrogen, carbon monoxide, carbon dioxide, hydrogen sulfide, ammonia and other higher hydrocarbons; and (c) at least partially separating the plurality of gaseous products to produce a stream comprising a predominant amount of one of the gaseous products.

DETAILED DESCRIPTION

The present disclosure relates to processes for preparing a substantially free-flowing alkali metal gasification catalyst-loaded carbonaceous particulate. The processes have advantages such as, for example, decreasing process waste by minimizing alkali catalyst solution volumes necessary, eliminating process steps such as dewatering/draining steps following treatment of a carbonaceous particulate with the catalyst solution, and has increasing energy efficiency by taking advantage (in the drying step) of sensible heat already in the wet cake as a result of the contacting step (which takes place at an elevated temperature).

Particulates formed according to the methods of the invention are useful, for example, in catalytic gasification processes, such as those that generate a plurality of gaseous products, including at least methane, from one or more carbonaceous feedstocks.

The present invention can be practiced in conjunction with the subject matter disclosed in commonly-owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0217587A1, US2009/0218424A1, US2009/0220406A1, US2009/0229182A1, US2009/0246120A1, US2009/0259080A1 and US2009/0260287A1.

Moreover, the present invention can be practiced in conjunction with the subject matter disclosed in commonly-owned U.S. patent application Ser. Nos. 12/492,467, 12/492,477, 12/492,484, 12/492,489 and 12/492,497, each of which was filed 26 Jun. 2009; 12/562,919, 12/562,921, 12/562,922 and 12/562,925, each of which was filed on 18 Sep. 2009; and 12/604,695, which was filed on 23 Oct. 2009.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although processes and materials similar or equivalent to those described herein can be used in the practice or testing of the present disclosure, suitable processes and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than 95% of the referenced material, and more preferably greater than 97% of the referenced material. The percent is on a molar basis when reference is made to a molecule (such as methane, carbon dioxide, carbon monoxide and hydrogen sulfide), and otherwise is on a weight basis (such as for entrained carbonaceous fines).

The term "unit" refers to a unit operation. When more than one "unit" is described as being present, those units are operated in a parallel fashion. A single "unit", however, may comprise more than one of the units in series. For example, an acid gas removal unit may comprise a hydrogen sulfide removal unit followed in series by a carbon dioxide removal unit. As another example, a trace contaminant removal unit may comprise a first removal unit for a first trace contaminant followed in series by a second removal unit for a second trace contaminant. As yet another example, a methane compressor unit may comprise a first methane compressor to compress the methane product stream to a first pressure, followed in series by a second methane compressor to further compress the methane product stream to a second (higher) pressure.

The materials, processes, and examples herein are illustrative only and, except as specifically stated, are not intended to be limiting.

Carbonaceous Materials and Feedstock

The substantially free-flowing alkali metal gasification catalyst-loaded carbonaceous particulates of the invention, prepared as described below, can be prepared from a carbonaceous feedstock comprising one or more carbonaceous materials. For example, the carbonaceous feedstock can comprise a mixture of a coal (e.g., anthracite, bituminous, or lignite) and/or a petroleum coke and/or a biomass.

The term "carbonaceous material" as used herein can be, for example, biomass and non-biomass materials as defined herein, as well as chars generated from their partial combustion or gasification. For example, see previously incorporated US2009/0217589A1 and US2009/0217575A1.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see previously incorporated US2009/0217575A1, US2009/0217587A1 and US2009/0229182A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but are not limited to, anthracite, bituminous coal, sub-bituminous coal, lignite, petroleum coke, asphaltenes, liquid petroleum residues or mixtures thereof. For example, see previously incorporated US2009/0166588A1, US2009/0165379A1, US2009/0165380A1, US2009/0165361A1, US2009/0217590A1 and US2009/0217586A1.

The terms "petroleum coke" and "petcoke" as used here includes both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil, which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke (dry basis). Typically, the petroleum coke comprises less than about 20 wt % inorganic compounds, based on the weight of the petroleum coke.

The term "asphaltene" as used herein is an aromatic carbonaceous solid at room temperature, and can be derived, from example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight (dry basis). In other embodiments, the coal has a carbon content ranging up to about 85%, or up to about 80%, or up to about 75% by weight, based on the total coal weight (dry basis). Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 20 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material." Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium. U.S. Bureau of Mines, Information Circular No. 8640, Washington, D.C., 1973.

The ratio of the carbonaceous materials used in the process can be selected based on technical considerations, processing economics, availability, and proximity of the various sources. The availability and proximity of the carbonaceous materials sources can affect the price of the feeds, and thus the overall catalytic gasification process production costs. For example, biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous feedstock, for example, a biomass and/or a non-biomass, can be used to control other material characteristics of the carbonaceous feedstock. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the catalytic gasifier, a solid purge of char comprising ash, unreacted carbonaceous material, and various alkali metal compounds (both water soluble and water insoluble) can be routinely withdrawn.

The ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the carbonaceous feedstock can comprise an ash content ranging from about 5 wt %, or from about 10 wt %, to about 20 wt %, or to about 15 wt %, based on the weight of the carbonaceous feedstock (dry basis). In other embodiments, the ash content of the carbonaceous feedstock can comprise less than about 20 wt %, or less than about 15 wt %, or less than about 10 wt %, or less than about 8 wt %, or less than about 6 wt % alumina, based on the weight of the ash. In certain embodiments, the carbonaceous feedstock can comprise an ash content of less than about 20 wt %, based on the weight of the particulate where the ash content of the carbonaceous feedstock comprises less than about 20 wt % alumina, or less than about 15 wt % alumina, based on the weight of the ash.

Such lower alumina values in the carbonaceous feedstock allow for, ultimately, decreased losses of alkali catalysts when used in catalytic gasification processes. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall gasification process.

Additionally, the carbonaceous feedstock can have a significantly higher % carbon, and thus btu/lb value and methane product per unit weight. In certain embodiments, the carbonaceous feedstock can have a carbon content ranging from about 75 wt %, or from about 80 wt %, or from about 85 wt %, or from about 90 wt %, up to about 95 wt %, based on the combined weight of the carbonaceous materials (dry basis).

As necessary, certain carbonaceous materials, for example, corn stover and switchgrass, industrial wastes, such as saw dust, and recycled carbonaceous fines recovered from the hot gases generated by a gasification reactor, may not be amenable to the dry grinding operations utilized in the preparative methods described below. Generally, pellets can be prepared by compaction of one or more carbonaceous materials. See, for example, previously incorporated US2009/0218424A1. In other examples, a biomass material and a coal can be formed into briquettes as described in U.S. Pat. No. 4,249,471, U.S. Pat. No. 4,152,119 and U.S. Pat. No. 4,225,457. Such pellets and/or briquettes may be used in subsequent dry-grinding operations.

Additional carbonaceous feedstock processing steps may be necessary depending on the qualities of carbonaceous material sources. Some caking coals can require partial oxidation to simplify catalytic gasifier operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Oxidative pre-treatment can be accomplished using any oxidant known to the art.

Alkali-Metal Gasification Catalysts

Suitable alkali metal gasification catalysts include alkali metal sources comprising lithium, sodium, potassium, rubidium, cesium, and mixtures thereof. In certain embodiments, the alkali metal source comprises potassium, sodium, or both. Particularly useful are potassium sources.

In particular, suitable alkali metal gasification catalysts include alkali metal carbonates, bicarbonates, formates, oxalates, amides, hydroxides, acetates, or similar compounds. In certain other embodiments, the alkali metal gasification catalyst is an alkali metal salt selected from the group consisting of carbonate, hydroxide, acetate, halide and nitrate salts. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the previously incorporated references.

Preparation of Catalyzed Carbonaceous Feedstock

Figure 1:
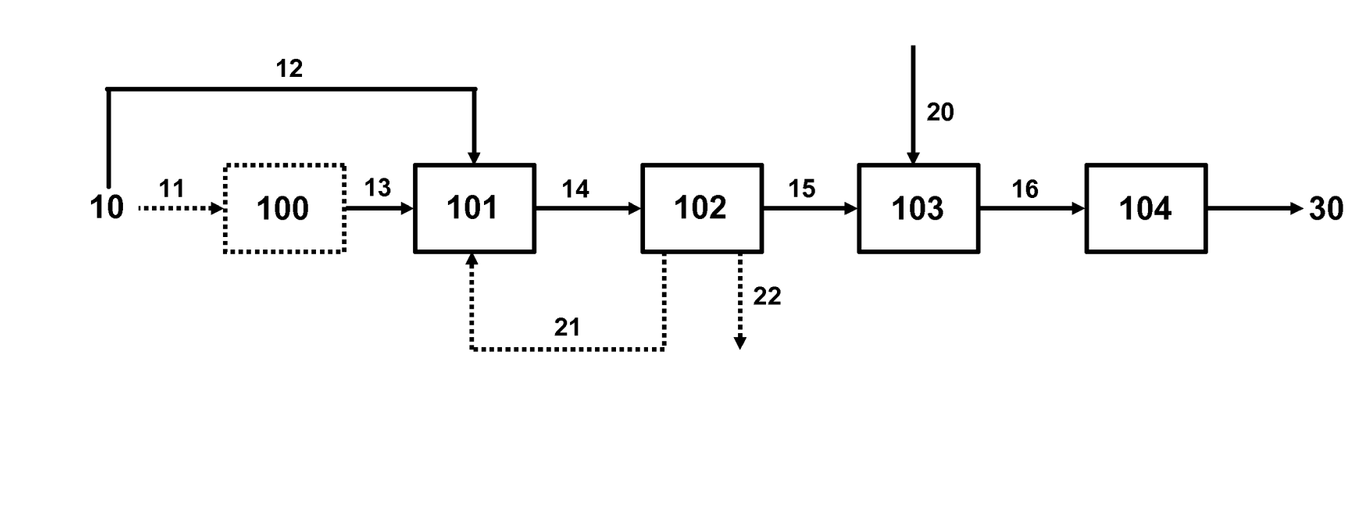
FIG. 1 is a diagram of an embodiment of a process for preparation of a substantially free-flowing alkali metal gasification catalyst-loaded carbonaceous particulate.

The present disclosure provides processes for preparing a substantially free-flowing alkali metal gasification catalyst-loaded carbonaceous particulate from a carbonaceous feedstock as illustrated in FIG. 1. As discussed above, the carbonaceous feedstock (10) can comprise one or more carbonaceous materials, each having an initial moisture content. For example, as received coals can have initial moisture contents ranging from about 20 wt % to about 40 wt %, and petcokes can have initial moisture contents ranging from 2 wt % to about 15 wt %.

The initial moisture content of the carbonaceous feedstock (10) can be determined according to methods familiar to those skilled in the art, for example, via thermal gravemetric analysis (TGA) Karl Fischer titration, or microwave absorption (see, Vermueuen and Hancke, "Moisture determination in coal using microwave techniques", Proceedings of the 1991 Industrial Conference on Electronics, Control and Instrumentation (IECON '91) 1991, 3, 2565-8).

In certain embodiments, the carbonaceous feedstock (10) comprises anthracite, bituminous coal, sub-bituminous coal, lignite, petroleum coke, biomass, or mixtures or one or more thereof. For example, the petroleum coke can comprise petroleum coke derived from tar sands, or petroleum coke derived from petroleum refining, or both, and can optionally be mixed with one or more coals.

The carbonaceous feedstock is converted to a first carbonaceous particulate (14) by grinding (101) according to methods known to those skilled in the art.

For example, the coal feedstock can be wet or dry ground in a ball mill, roller mill, hammer mill, tumbling mill, colloid mill, bowl mill and/or rod mill.

Generally, the moisture content of the carbonaceous feedstock (10), after grinding and/or classification, should be such that, after contacting with the aqueous solution (20) in step (103) (in FIG. 1), the resulting wet cake is "substantially non-draining".

The term "non-draining" as used herein means that the amount of aqueous solution utilized does not exceed the drain point of the alkali metal gasification catalyst-loaded carbonaceous particulate wet cake, i.e., the wet cake does not contain excess liquid which readily drains when, for example, placed over a mesh (of a size appropriate for the particulate content). The drain point of a particular wet cake is dependent on, for example, particle size, particulate material, presence of surfactants, temperature, and a number of other factors as recognized by those of ordinary skill in the relevant art.

"Substantially non-draining" in this context means that the wet cake should have minimal extra moisture, but does not need to be completely non-draining, such that an additional moisture removal step is avoided, and the wet cake moisture content is not excessive for the drying step (to minimize energy requirements). The term is intended to cover the slight variances that would normally be expected in the commercial operation of a process of a type that is in accordance with the present invention.

If, however, the initial moisture content of the carbonaceous feedstock (10) is determined to be too high to allow formation of a substantially non-draining wet cake, the initial moisture content may be reduced, for example, via draining, air drying, forced air drying, or similar methods.

Drying (if required) may also occur concurrently with dry grinding. When moisture reduction is required, dry and/or heated gas (such as air or nitrogen) can be passed through the dry grinding apparatus before, during and/or after grinding.

As a generalized example, a wet cake of a particular feedstock of a given particle size range may be determined to have a drain point at 50 wt % moisture content (based on the total weight of the wet cake). If the initial moisture content of the feedstock is 40 wt % (based on the total weight of the feedstock), and the aqueous catalyst solution in the amount used has a water content amounting to an additional 30 wt % (based on the total weight of the feedstock), the wet cake resulting from the combination of the feedstock and aqueous catalyst solution will have a total moisture content of greater than about 50 wt % (based on the total weight of the wet cake), and thus above the drain point of the wet cake. To offset this extra moisture, the initial moisture content of the feedstock can be reduced, a smaller volume of a more concentrated catalyst solution may be used, or both measures may be taken. In one particular embodiment, the initial moisture content is reduced (where required) in the dry grinding stage (101).

In particular examples, biomass may contain high moisture contents, such as green plants and grasses, and may require drying prior to grinding. Likewise, non-biomass, such as very high-moisture coals, can require drying prior to grinding. Municipal wastes and sewages also may contain high moisture contents which may be reduced, for example, by use of a press or roll mill (e.g., U.S. Pat. No. 4,436,028).

In the case of wet grinding, moisture reduction may be accomplished subsequent to the wet grinding, and/or during and/or after the classification steps, for example, by any one or a combination of draining and drying (as discussed above).

A suitable initial moisture content can depend on the nature of the carbonaceous material in the carbonaceous feedstock. For example, drying a coal to too low a moisture level can destroy acidic functionality (ion exchange sites), and is undesirable.

When the carbonaceous feedstock (10) comprises a plurality of carbonaceous materials, the portion (11) of the carbonaceous feedstock which has too high of an initial moisture content can be dried (100) to reduce the moisture content to a suitable level; and the portion (12) of the carbonaceous feedstock which has a suitable initial moisture content can be provided directly to a dry grinding process (101). For example, a biomass can be dried and combined in the grinding step, or combined before the grinding step with a suitably dry coal or petcoke.

Also, when the carbonaceous feedstock (10) comprises a plurality of carbonaceous materials, the portion (11) of the carbonaceous feedstock which has too high of an initial moisture content can be blended with a dry component to reduce the overall moisture content to a suitable level (i.e., a dried feedstock 13). For example, a higher moisture coal can be blended in the grinding step, or combined before or after the grinding step, with a lower moisture level petcoke, as disclosed in previously incorporated US2009/0166588A1.

Alternatively, when the carbonaceous feedstock (10) comprises a plurality of carbonaceous materials and the carbonaceous feedstock (10), as a whole, has too high of a moisture content, then the entire carbonaceous feedstock (10) may be provided to a drying operation (100) for reducing the moisture content thereof to a suitable level (13), or partially dried in the dry grinding operation, or dried subsequent to the grinding operation (wet or dry grinding).

After grinding (101), the first carbonaceous particulate (14) is classified (102) to a specified particle size profile to produce a carbonaceous particulate (15). Classification (102) of the first particulate (14) can be accomplished according to methods familiar to those skilled in the art. Classification equipment can include ore sorters, gas cyclones, hydrocyclones, rake classifiers, rotating trommels or fluidized classifiers. The specified particle size profile has a d5 particle size of at least about 20 microns, a d95 particle size of about 1000 microns or less, and a d50 particle size ranging from about 75 to about 350 microns. For example, the specified particle size profile can have a d5 particle size between about 20 microns and 100 microns; a d95 particle size between about 500 and 1000 microns; and a d50 particle size between about 45 and 500 microns. Terms of the form "d# particle size", such as d5, d50, and d95, refer to the cut-particle diameter of the particulate where #% of the particles in the total distribution of the referenced sample have the noted particle diameter or smaller. For example, a d5 particle size of 20 microns means that 5% of the particles in the sample have a diameter of 20 microns or less. In another example, a d95 particle size of 1000 microns means that 95% of the particles in the sample have a diameter of 1000 microns or less.

The fines portion (22) of the first carbonaceous particulate, which does not satisfy the preceding specified particle size profile for subsequent treatment with alkali metal gasification catalyst, can be used, for example, as fuel for steam and/or power generation. For example, see previously incorporated US2009/0165361A1, US2009/0165376A1, US2009/0217584A1 and US2009/0217585A1. Alternatively, the fines portion (22) may be briquetted, as discussed earlier, for recycling within the process of preparing the carbonaceous particulate (15) to minimize waste of the carbonaceous materials.

The coarse portion (21) of the first carbonaceous particulate (14), which does not satisfy the preceding specified particle size profile for subsequent treatment with alkali metal gasification catalyst, can also be recycled for continued dry-grinding (101) within the process of preparing the carbonaceous particulate (15) to minimize waste of the carbonaceous materials.

The carbonaceous particulate (15) is contacted (103) with an amount of an aqueous solution (20) comprising a concentration of an alkali metal gasification catalyst, under conditions suitable to form a substantially non-draining alkali metal gasification catalyst-loaded carbonaceous particulate wet cake (16) having a specified ratio of alkali metal atoms to carbon atoms and a second moisture content. In one embodiment, the wet cake is non-draining. In another embodiment, the moisture content of the wet cake is at least about 2 wt %, or at least about 5 wt %, or at least about 10 wt %, less than the moisture content of the wet cake at the drain point.

The amount of aqueous solution (20) and the concentration of the alkali metal gasification catalyst used for contacting the carbonaceous particulate (15) are selected to be sufficient to provide the specified ratio of alkali metal atoms to carbon atoms in the non-draining alkali metal gasification catalyst-loaded carbonaceous particulate wet cake (16) and are sufficient to provide a ratio of alkali metal atoms to carbon atoms in the substantially free-flowing particulate (30, infra) between about 0.01 to about 0.10. Typically, one or more alkali metal sources are present in an amount sufficient to provide a ratio of alkali metal atoms to carbon atoms in the substantially free-flowing particulate (30) ranging from about 0.01, or from about 0.02, or from about 0.03, or from about 0.04, to about 0.10, or to about 0.08, or to about 0.07, or to about 0.06.

The contacting (103) of the carbonaceous particulate (15) with an amount of an aqueous solution (20) comprising a concentration of an alkali metal gasification catalyst takes place at an elevated temperature substantially at or below the boiling point of water, at substantially atmospheric pressure, under agitation and for a specified amount of time, each of which is in an amount sufficient in combination to allow substantially even distribution of the alkali metal gasification catalyst within the non-draining alkali metal gasification catalyst-loaded carbonaceous particulate wet cake (16).

"An elevated temperature substantially at or below the boiling point of water" is intended to include a temperature above ambient temperature, but not so high that the contacting process occurs under pressurized conditions, in conjunction with the term "at substantially atmospheric pressure". The term is intended to cover the slight variances that would normally be expected in the commercial operation of a process of a type that is in accordance with the present invention. In other words, the contacting should not require a pressurization at the beginning, or a depressurization at the end. For example, the contacting can take place at a temperature of from about 80° C., or from about 90° C., or from about 95° C., to about 100° C., at atmospheric pressure.

The contacting may take place under a flow of air or nitrogen (exclusion of gaseous oxygen is not required), but it may be desirable to not significantly alter the moisture content during the contacting stage thus, at elevated temperatures, no flow of gas is desirable. Further the contacting can take place for a period of time ranging, for example, from about 5 minutes to about 60 minutes, or to about 45 minutes, or to about 30 minutes.

Agitation can include any methods known for mixing a wet cake composition to provide the substantially even distribution, including but not limited to, kneading and shear mixing (e.g., blending). The term "substantially even distribution" as used herein means that the alkali metal gasification catalyst is consistently distributed throughout the wet cake.

In certain embodiments, the non-draining alkali metal gasification catalyst-loaded carbonaceous particulate wet cake (16) is kneaded according to methods familiar to those skilled in the art and under the conditions described above to allow substantially even distribution of the alkali metal gasification catalyst within the non-draining wet cake (16). For example, the non-draining wet cake can be kneaded in a heated single or double screw mixer, a pug mill or a ribbon mixer of a type well known to those of ordinary skill in the relevant art. Mixing may be batch or continuous.

Finally, the non-draining alkali metal gasification catalyst-loaded carbonaceous particulate wet cake (16), upon completion of agitation as discussed above, is thermally treated (104) to reduce the second moisture content to produce the alkali metal gasification catalyst-loaded carbonaceous particulate as a substantially free-flowing particulate (30). The term "substantially free-flowing" as used herein means the particulates do not agglomerate due to moisture content.

The non-draining alkali metal gasification catalyst loaded carbonaceous particulate wet cake (16) exits the contacting step (103) at a first temperature, which is typically about the same temperature as is present during the contacting step. In order to take advantage of the sensible heat already in the wet cake (for improved efficiency), the wet cake is passed directly from the contacting step (103) to the drying step (104) without significant cooling. In other words, the wet cake is passed into the thermal treating step at substantially the same temperature that it exits the contacting step.

The second moisture content of the non-draining alkali metal gasification catalyst-loaded carbonaceous particulate wet cake (16) can be reduced via treatment by a fluid bed slurry drier (i.e., treatment with superheated steam to vaporize the liquid), or by thermal evaporation or can be removed under a vacuum, or under a flow of an inert (dry) gas, or via heat exchange, to provide the substantially free-flowing particulate. In one embodiment, gaseous oxygen should be substantially excluded from the drying step.

The resulting substantially free-flowing particulate (30) can having a residual moisture content, for example, of about 10 wt % or less, or of about 8 wt % or less, or about 6 wt % or less, or about 5 wt % or less, or about 4 wt % or less.

The substantially free-flowing particulates (30) prepared according to the preceding methods can be combined with a second carbonaceous particulate by any methods known to those skilled in the art. The second carbonaceous particulate can comprise one or more carbonaceous materials and can be prepared according to any methods familiar to those skilled in the art. Methods for combining the substantially free-flowing particulates (30) with one or more second carbonaceous particulates include, but are not limited to, kneading, and vertical or horizontal mixers, for example, single or twin screw, ribbon, or drum mixers. The resulting blended particulates can be stored for future use or transferred to one or more feed operations for introduction into the catalytic gasifiers.

Integrated Gasification Process

The integrated processes of the invention for producing a methane-enriched gas from the substantially free-flowing particulate can be employed with any type of alkali metal catalyzed gasification systems known in the art. Examples of such systems include, for example, those disclosed in previously incorporated US2009/0165381A1, US2009/0170968A1, US2009/0217584A1, US2009/0217585A1, US2009/0217588A1, US2009/00217589A1, US2009/0220406A1, US2009/0246120A1, US2009/0259080A1 and US2009/0260287A1; and U.S. patent application Ser. Nos. 12/492,467, 12/492,477, 12/492,484, 12/492,489, 12/492,497, 12/562,919, 12/562,921, 12/562,922, 12/562,925 and 12/604,695.

The catalytic gasifiers for such processes are typically operated at moderately high pressures and temperature, requiring introduction of the substantially free-flowing particulate (30) to a reaction chamber of the catalytic gasifier while maintaining the required temperature, pressure, and flow rate of the feedstock. Those skilled in the art are familiar with feed inlets to supply the catalyzed carbonaceous feedstock into the reaction chambers having high pressure and/or temperature environments, including, star feeders, screw feeders, rotary pistons, and lock-hoppers. It should be understood that the feed inlets can include two or more pressure-balanced elements, such as lock hoppers, which would be used alternately. In some instances, the catalyzed carbonaceous feedstock can be prepared at pressure conditions above the operating pressure of catalytic gasifier. Hence, the particulate composition can be directly passed into the catalytic gasifier without further pressurization.

Any of several types of catalytic gasifiers can be utilized. Suitable catalytic gasifiers include those having a reaction chamber which is a counter-current fixed bed, a co-current fixed bed, a fluidized bed, or an entrained flow or moving bed reaction chamber. Examples of such systems include, for example, those disclosed in previously incorporated U.S. patent application Ser. Nos. 12/562,921, 12/562,922, 12/562,925 and 12/604,695.

Gasification in the catalytic gasifier is typically affected at moderate temperatures of at least about 450° C., or of at least about 600° C., or of at least about 650° C., to about 900° C., or to about 800° C., or to about 750° C.; and at pressures of at least about 50 psig, or at least about 200 psig, or at least about 400 psig, to about 1000 psig, or to about 700 psig, or to about 600 psig.

The gas utilized in the catalytic gasifier for pressurization and reactions of the particulate composition can comprise, for example, steam, oxygen, nitrogen, air, syngas (mixtures of carbon monoxide and hydrogen) or inert gases such as argon which can be supplied to the reactor according to methods known to those skilled in the art.

Any of the steam boilers known to those skilled in the art can supply steam for the catalytic gasifier. Such boilers can be powered, for example, through the use of any carbonaceous material such as powdered coal, biomass etc., and including but not limited to rejected carbonaceous materials from the feedstock preparation operations (e.g., fines, supra). Steam can also be supplied from an additional gasifier coupled to a combustion turbine where the exhaust from the reactor is thermally exchanged to a water source and produce steam. Alternatively, the steam may be generated for the catalytic gasifiers as described in previously incorporated US2009/0165376A1, US2009/0217584A1 and US2009/0217585A1; and U.S. patent application Ser. No. 12/562,925.

Steam recycled or generated from other process operations can also be used as a sole steam source, or in combination with the steam from a steam generator to supply steam to the catalytic gasifier. For example, when the slurried carbonaceous materials are dried with a fluid bed slurry drier, as discussed above, the steam generated through vaporization can be fed to the catalytic gasifier. When a heat exchanger unit is used for stream generation, the steam can be fed directly to the catalytic gasifier as well.

The catalytic conversion of a carbon source to methane that occurs in the catalytic gasifier typically involves three separate reactions:

Steam carbon: $C + H_2O \rightarrow CO + H_2$

Water-gas shift: $CO + H_2O \rightarrow H_2 + CO_2$

Hydro-gasification: $2H_2 + C \rightarrow CH_4$

CO Methanation: $CO + 3H_2 \rightarrow CH_4 + H_2O$

These four reactions are together essentially thermally balanced; however, due to process heat losses and other energy requirements (such as required for evaporation of moisture entering the catalytic gasifier with the feedstock), some heat must be added to the catalytic gasifier to maintain the thermal balance. The addition of superheated steam at a temperature above the operating temperature of the catalytic gasifier can be one mechanism for supplying this extra heat. A person of ordinary skill in the art can determined the amount of heat required to be added to the catalytic gasifier to substantially maintain thermal balance.

Hot gas effluent stream leaving the reaction chamber of catalytic gasifier can pass through a fines remover unit portion (not depicted) of the catalytic gasifier which serves as a disengagement zone where particles too heavy to be entrained by the gas leaving the catalytic gasifier (i.e., fines) are returned to the reaction chamber (e.g., fluidized bed). The fines remover unit can include one or more internal and/or external cyclone separators or similar devices to remove fines and particulates from the hot first gas. The hot first gas effluent leaving the catalytic gasifier generally comprises $CH_4$, $CO_2$, $H_2$, CO, $H_2S$, $NH_3$, unreacted steam, entrained fines, and other contaminants such as COS, HCN and/or elemental mercury vapor, depending on the nature of the carbonaceous material utilized for gasification.

Residual entrained fines can be substantially removed by any suitable device such as external cyclone separators optionally followed by Venturi scrubbers. The recovered fines can be processed to recover alkali metal catalyst, or directly recycled back to feedstock preparation as described in previously incorporated US2009/0217589A1.

Removal of a "substantial portion" of fines means that an amount of fines is removed from the hot first gas stream such that downstream processing is not adversely affected; thus, at least a substantial portion of fines should be removed. Some minor level of ultrafine material may remain in hot first gas stream to the extent that downstream processing is not significantly adversely affected. Typically, at least about 90 wt %, or at least about 95 wt %, or at least about 98 wt %, of the fines of a particle size greater than about 20 μm, or greater than about 10 μm, or greater than about 5 μm, are removed.

The first gas stream, upon exiting reactor, will typically comprise at least about 20 mol % methane based on the moles of methane, carbon dioxide, carbon monoxide and hydrogen in the first gas stream. In addition, the first gas stream will typically comprise at least about 50 mol % methane plus carbon dioxide, based on the moles of methane, carbon dioxide, carbon monoxide and hydrogen in the first gas stream.

The first gas stream may be provided to a heat exchanger to reduce the temperature of the first gas stream (e.g., to generate a cooled gas stream having a temperature less than first gas stream) prior to introduction to acid gas removal (AGR) processes for the methanation processes described herein.

Depending on gasification conditions, the first gas stream can be generated having at a temperature ranging from about 450° C. to about 900° C. (more typically from about 650° C. to about 800° C.), a pressure of from about 50 psig to about 1000 psig (more typically from about 400 psig to about 600 psig), and a velocity of from about 0.5 ft/sec to about 2.0 ft/sec (more typically from about 1.0 ft/sec to about 1.5 ft/sec). The heat energy extracted by any one or more of the heat exchanger units, when present, can be used, for example, to generate steam. The resulting cooled gas stream will typically exit the heat exchanger at a temperature ranging from about 250° C. to about 600° C. (more typically from about 300° C. to about 500° C.), a pressure of from about 50 psig to about 1000 psig (more typically from about 400 psig to about 600 psig), and a velocity of from about 0.5 ft/sec to about 2.5 ft/sec (more typically from about 1.0 ft/sec to about 1.5 ft/sec).

A subsequent acid gas removal unit can be used to remove a substantial portion of $H_2S$ and $CO_2$ from the second gas stream and generate a third gas stream, which can be a methane product stream or can go through further purification/treatment to produce methane product stream. Acid gas removal processes typically involve contacting the second gas stream with a solvent such as monoethanolamine, diethanolamine, methyldiethanolamine, diisopropylamine, diglycolamine, a solution of sodium salts of amino acids, methanol, hot potassium carbonate or the like to generate $CO_2$ and/or $H_2S$ laden absorbers. One method can involve the use of Selexol® (UOP LLC, Des Plaines, Ill. USA) or Rectisol® (Lurgi A G, Frankfurt am Main, Germany) solvent having two trains; each train consisting of an $H_2S$ absorber and a $CO_2$ absorber.

The resulting third gas stream can comprise $CH_4$, $H_2$, and, optionally, CO when the sour shift unit (supra) is not part of the process, and typically, small amounts of $CO_2$ and $H_2O$. One method for removing acid gases from the second gas stream is described in previously incorporated US2009/0220406A1.

At least a substantial portion (e.g., substantially all) of the $CO_2$ and/or $H_2S$ (and other remaining trace contaminants) should be removed via the acid gas removal units. "Substantial" removal in the context of acid gas removal means removal of a high enough percentage of the component such that a desired end product can be generated. The actual amounts of removal may thus vary from component to component. For "pipeline-quality natural gas", only trace amounts (at most) of $H_2S$ can be present, although higher amounts of $CO_2$ may be tolerable.

Typically, acid gas removal should remove at least about 85%, or at least about 90%, or at least about 92%, of the $CO_2$, and at least about 95%, or at least about 98%, or at least about 99.5%, of the $H_2S$, from the second gas stream.

Losses of desired product (methane) in the acid gas removal step should be minimized such that the acid gas-depleted stream comprises at least a substantial portion (and substantially all) of the methane from the second gas stream. Typically, such losses should be about 2 mol % or less, or about 1.5 mol % or less, or about 1 mol % of less, of the methane from the cooled first gas stream.

Additional Integrated Gasification Embodiments

As described in more detail above, in certain embodiments of the carbonaceous feedstock can comprise any of a number of carbonaceous materials. For example, in one embodiment of the invention, the carbonaceous feedstock can comprise one or more of anthracite, bituminous coal, sub-bituminous coal, lignite, petroleum coke, asphaltenes, or biomass.

In certain embodiments of the invention, the substantially free-flowing particulate and superheated steam are introduced into a plurality of catalytic gasifiers. The first gas streams emerging from the separate catalytic gasifiers can be then further treated separately, or can be recombined at any point in the downstream process.

As the person of skill in the art will appreciate, the processes described herein can be performed, for example, as continuous processes or batch processes.

In certain embodiments, the process is a once-through process. In a "once-through" process, there exists no recycle of carbon-based gas into the gasifier from any of the gas streams downstream from the catalytic gasifier. However, in other embodiments of the invention, the process can include a recycle carbon-based gas stream. For example, to provide a balance of hydrogen and/or carbon monoxide in the catalytic gasifier during start up conditions, a methane-containing stream (taken from, e.g., a methane-enriched first gas stream, a methane-enriched second stream or a methane product stream) can be reformed in a reformer to form carbon monoxide and hydrogen, which can be admitted to the catalytic gasifier along with the carbonaceous feedstock, the oxygen-rich gas stream and the gasification catalyst. In continuous operation, however, it is desirable to operate the process as a "once-through" process.

The invention provides processes that, in certain embodiments, are capable of generating "pipeline-quality natural gas" from the catalytic gasification of a carbonaceous feedstock. A "pipeline-quality natural gas" typically refers to a natural gas that is (1) within ±5% of the heating value of pure methane (whose heating value is 1010 btu/ft$^3$ under standard atmospheric conditions), (2) substantially free of water (typically a dew point of about −40° C. or less), and (3) substantially free of toxic or corrosive contaminants. In some embodiments of the invention, the methane product stream described in the above processes satisfies such requirements.

Pipeline-quality natural gas can contain gases other than methane, as long as the resulting gas mixture has a heating value that is within ±5% of 1010 btu/ft$^3$ and is neither toxic nor corrosive. Therefore, a methane product stream can comprise gases whose heating value is less than that of methane and still qualify as a pipeline-quality natural gas, as long as the presence of other gases does not lower the gas stream's heating value below 950 btu/scf (dry basis). A methane product stream can, for example, comprise up to about 4 mol % hydrogen and still serve as a pipeline-quality natural gas. Carbon monoxide has a higher heating value than hydrogen; thus, pipeline-quality natural gas could contain even higher percentages of CO without degrading the heating value of the gas stream. A methane product stream that is suitable for use as pipeline-quality natural gas preferably has less than about 1000 ppm CO.

Optional Supplemental Gasification Processes (a) Catalyst Recovery

Reaction of the substantially free-flowing particulate (30) under the described conditions generally provides the first gas stream and a solid char product from the catalytic gasifier. The solid char product typically comprises quantities of unreacted carbonaceous material and entrained catalyst. The solid char product can be removed from the reaction chamber for use as the methanation catalyst, sampling, purging, and/or catalyst recovery via a char outlet.

The solid char product, containing entrained catalyst, can be passed to a catalyst recovery unit, where catalyst is recovered and recycled for the aqueous solution used in step (D).

The term "entrained catalyst" as used herein means chemical compounds comprising an alkali metal component. For example, "entrained catalyst" can include, but is not limited to, soluble alkali metal compounds (such as alkali carbonates, alkali hydroxides, and alkali oxides) and/or insoluble alkali compounds (such as alkali aluminosilicates). The nature of catalyst components associated with the char extracted from a catalytic gasifier and methods for their recovery are discussed below, and in detail in previously incorporated US2007/0277437A1, US2009/0165383A1, US2009/0165382A1, US2009/0169449A1 and US2009/0169448A1.

The solid char product can be periodically withdrawn from each of the catalytic gasifiers through a char outlet which is a lock hopper system, although other methods are known to those skilled in the art. Methods for removing solid char product are well known to those skilled in the art. One such method taught by EP-A-0102828, for example, can be employed.

Char from the catalytic gasifier may be passed to a catalytic recovery unit, as described below. Alternatively, such char may be passed to a catalyst recovery unit operation, as described below. Such char may also be split into multiple streams, one of which may be passed to a catalyst recovery unit, and another which may be used as a methanation catalyst (as described above) and not treated for catalyst recovery.

In certain embodiments, the alkali metal in the entrained catalyst in the solid char product withdrawn from the reaction chamber of the catalytic gasifier can be recovered, and any unrecovered catalyst can be compensated by a catalyst make-up stream. The more alumina and silica that is in the feedstock, the more costly it is to obtain a higher alkali metal recovery.

In one embodiment, the solid char product from the catalytic gasifiers can be quenched with a recycle gas and water to extract a portion of the entrained catalyst. The recovered catalyst can be directed to the catalyst loading processes for reuse of the alkali metal catalyst. The depleted char can, for example, be directed to any one or more of the feedstock preparation operations for reuse in preparation of the catalyzed feedstock, combusted to power one or more steam generators (such as disclosed in previously incorporated US2009/0165376A1 and US2009/0217585A1), or used as such in a variety of applications, for example, as an absorbent (such as disclosed in previously incorporated US2009/0217582A1).

Other particularly useful recovery and recycling processes are described in U.S. Pat. No. 4,459,138, as well as previously incorporated US2007/0277437A1, US2009/0165383A1, US2009/0165382A1, US2009/0169449A1 and US2009/0169448A1. Reference can be had to those documents for further process details.

The recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

(b) Gas Purification

Product purification may comprise, for example, optional trace contaminant removal, ammonia removal and recovery, and sour shift processes. The acid gas removal (supra) may be performed on the cooled first gas stream passed directly from a heat exchanger, or on the cooled first gas stream that has passed through either one or more of (i) one or more of the trace contaminants removal units; (ii) one or more sour shift units; (iii) one or more ammonia recovery units and (iv) the sulfur-tolerant catalytic methanators as discussed below.

(1) Trace Contaminant Removal

As is familiar to those skilled in the art, the contamination levels of the gas stream, e.g., cooled first gas stream, will depend on the nature of the carbonaceous material used for preparing the catalyzed carbonaceous feed stock. For example, certain coals, such as Illinois #6, can have high sulfur contents, leading to higher COS contamination; and other coals, such as Powder River Basin coals, can contain significant levels of mercury which can be volatilized in the catalytic gasifier.

COS can be removed from a gas stream, e.g., the cooled first gas stream, for example, by COS hydrolysis (see, U.S. Pat. No. 3,966,875, U.S. Pat. No. 4,011,066, U.S. Pat. No. 4,100,256, U.S. Pat. No. 4,482,529 and U.S. Pat. No. 4,524,050), passing the cooled first gas stream through particulate limestone (see, U.S. Pat. No. 4,173,465), an acidic buffered $CuSO_4$ solution (see, U.S. Pat. No. 4,298,584), an alkanolamine absorbent such as methyldiethanolamine, triethanolamine, dipropanolamine, or diisopropanolamine, containing tetramethylene sulfone (sulfolane, see, U.S. Pat. No. 3,989,811); or counter-current washing of the cooled first gas stream with refrigerated liquid $CO_2$ (see, U.S. Pat. No. 4,270,937 and U.S. Pat. No. 4,609,388).

HCN can be removed from a gas stream, e.g., the cooled first gas stream, by reaction with ammonium sulfide or polysulfide to generate $CO_2$, $H_2S$ and $NH_3$ (see, U.S. Pat. No. 4,497,784, U.S. Pat. No. 4,505,881 and U.S. Pat. No. 4,508,693), or a two stage wash with formaldehyde followed by ammonium or sodium polysulfide (see, U.S. Pat. No. 4,572,826), absorbed by water (see, U.S. Pat. No. 4,189,307), and/or decomposed by passing through alumina supported hydrolysis catalysts such as $MoO_3$, $TiO_2$ and/or $ZrO_2$ (see, U.S. Pat. No. 4,810,475, U.S. Pat. No. 5,660,807 and U.S. Pat. No. 5,968,465).

Elemental mercury can be removed from a gas stream, e.g., the cooled first gas stream, by absorption by carbon activated with sulfuric acid (see, U.S. Pat. No. 3,876,393), absorption by carbon impregnated with sulfur (see, U.S. Pat. No. 4,491,609), absorption by a $H_2S$-containing amine solvent (see, U.S. Pat. No. 4,044,098), absorption by silver or gold impregnated zeolites (see, U.S. Pat. No. 4,892,567), oxidation to HgO with hydrogen peroxide and methanol (see, U.S. Pat. No. 5,670,122), oxidation with bromine or iodine containing compounds in the presence of $SO_2$ (see, U.S. Pat. No. 6,878,358), oxidation with a H, Cl and O-containing plasma (see, U.S. Pat. No. 6,969,494), and/or oxidation by a chlorine-containing oxidizing gas (e.g., ClO, see, U.S. Pat. No. 7,118,720).

When aqueous solutions are utilized for removal of any or all of COS, HCN and/or Hg, the waste water generated in the trace contaminants removal units can be directed to a waste water treatment unit.

When present, a trace contaminant removal unit for a particular trace contaminant should remove at least a substantial portion (or substantially all) of that trace contaminant from the so-treated gas stream (e.g., cooled first gas stream), typically to levels at or lower than the specification limits of the desired product stream. Typically, a trace contaminant removal unit should remove at least 90%, or at least 95%, or at least 98%, of COS, HCN and/or mercury from a cooled first gas stream.

(2) Sour Shift

A gas steam, e.g., the cooled first gas stream, also can be subjected to a water-gas shift reaction in the presence of an aqueous medium (such as steam) to convert a portion of the CO to $CO_2$ and to increase the fraction of $H_2$. In certain examples, the generation of increased hydrogen content can be utilized to form a hydrogen product gas which can be separated from methane as discussed below. In certain other examples, a sour shift process may be used to adjust the carbon monoxide:hydrogen ratio in a gas stream, e.g., the cooled first gas stream, for providing to a subsequent methanator. The water-gas shift treatment may be performed on the cooled first gas stream passed directly from the heat exchanger or on the cooled first gas stream that has passed through a trace contaminants removal unit.

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated US2009/0246120A1.

Steam shifting is often carried out with heat exchangers and steam generators to permit the efficient use of heat energy. Shift reactors employing these features are well known to those of skill in the art. An example of a suitable shift reactor is illustrated in previously incorporated U.S. Pat. No. 7,074,373, although other designs known to those of skill in the art are also effective. Following the sour gas shift procedure, the one or more cooled second gas streams each generally contains $CH_4$, $CO_2$, $H_2$, $H_2S$, $NH_3$, and steam.

In some embodiments, it will be desirable to remove a substantial portion of the CO from a cooled gas stream, and thus convert a substantial portion of the CO. "Substantial" conversion in this context means conversion of a high enough percentage of the component such that a desired end product can be generated. Typically, streams exiting the shift reactor, where a substantial portion of the CO has been converted, will have a carbon monoxide content of about 250 ppm or less CO, and more typically about 100 ppm or less CO.

In other embodiments, it will be desirable to convert only a portion of the CO so as to increase the fraction of $H_2$ for a subsequent methanation, e.g., a trim methanation, which will typically require an $H_2$/CO molar ratio of about 3 or greater, or greater than about 3, or about 3.2 or greater.

(3) Ammonia Recovery

As is familiar to those skilled in the art, gasification of biomass and/or utilizing air as an oxygen source for the catalytic gasifier can produce significant quantities of ammonia in the product gas stream. Optionally, the cooled first gas stream can be scrubbed by water in one or more ammonia recovery units to recovery ammonia. The ammonia recovery treatment may be performed, for example, on the cooled second gas stream passed directly from the heat exchanger or on a gas stream, e.g., the cooled gas stream, that has passed through either one or both of (i) one or more of the trace contaminants removal units; and (ii) one or more sour shift units.

After scrubbing, the gas stream, e.g., the cooled first gas stream, can comprise at least $H_2S$, $CO_2$, CO, $H_2$ and $CH_4$. When the cooled gas stream has previously passed through a sour shift unit, then, after scrubbing, the gas stream can comprise at least $H_2S$, $CO_2$, $H_2$ and $CH_4$.

Ammonia can be recovered from the scrubber water according to methods known to those skilled in the art, can typically be recovered as an aqueous solution (e.g., 20 wt %). The waste scrubber water can be forwarded to a waste water treatment unit.

When present, an ammonia removal process should remove at least a substantial portion (and substantially all) of the ammonia from the scrubbed stream, e.g., the cooled first gas stream. "Substantial" removal in the context of ammonia removal means removal of a high enough percentage of the component such that a desired end product can be generated. Typically, an ammonia removal process will remove at least about 95%, or at least about 97%, of the ammonia content of a scrubbed first gas stream.

(4) Methanation

As just described, the integrated gasification processes of the present invention can utilize at least one methanation step to generate methane from the carbon monoxide and hydrogen present in one or more of the first gas streams (e.g., hot first gas stream, and/or cooled first gas stream), and/or third gas stream. For example, in one embodiment of the invention, at least a portion of the carbon monoxide and at least a portion of the hydrogen present in the cooled first gas stream is reacted in a catalytic methanator in the presence of a sulfur-tolerant char methanation catalyst to produce a methane-enriched first gas stream, which can then be subjected to acid gas removal as described above. In other embodiments of the invention, if the second gas stream and/or third gas stream comprises hydrogen and greater than above 100 ppm carbon monoxide, carbon monoxide and hydrogen present in the gas stream can be reacted in a catalytic methanator, e.g., a trim methanator, in the presence of a methanation catalyst, e.g., such as the char methanation catalyst, to produce a methane-enriched gas stream. In certain embodiments of the invention, both of these methanation steps are performed.

The first gas streams may contain significant quantities of hydrogen sulfide which can deactivate methanation catalysts such as catalysts comprising iron, nickel and cobalt compounds. Therefore, the methanator may contain a sulfur-tolerant methanation catalyst such as the char methanation catalyst described above, or alternatively a mixture of the char methanation catalyst of the invention and another sulfur-tolerant methanation catalyst such as, for example, molybdenum and/or tungsten sulfides. For example, see previously incorporated U.S. patent application Ser. No. 12/562,919. Further examples of sulfur-tolerant methanation catalysts include, but are not limited to, catalysts disclosed in U.S. Pat. No. 4,243,554, U.S. Pat. No. 4,243,553, U.S. Pat. No. 4,006,177, U.S. Pat. No. 3,958,957, U.S. Pat. No. 3,928,000, U.S. Pat. No. 2,490,488; Mills and Steffgen, in Catalyst Rev. 8, 159 (1973)), and Schultz et al, U.S. Bureau of Mines, Rep. Invest. No. 6974 (1967).

(c) Methane Removal

The gas stream(s), e.g. the third gas stream, generated from the gasification of carbonaceous feedstock can be processed to separate and recover $CH_4$ by any suitable gas separation method known to those skilled in the art including, but not limited to, cryogenic distillation and the use of molecular sieves or gas separation (e.g., ceramic) membranes. For example, when a sour shift unit is present, a gas stream may contain methane and hydrogen which can be separated according to methods familiar to those skilled in the art.

Other gas purification methods include via the generation of methane hydrate as disclosed in previously incorporated US2009/0246120A1, US2009/0259080A1 and US2009/0260287A1.

(d) Power Generation

A portion of the steam generated by the steam source may be provided to one or more power generators, such as a steam turbine, to produce electricity which may be either utilized within the plant or can be sold onto the power grid. High temperature and high pressure steam produced within the gasification process may also be provided to a steam turbine for the generation of electricity. For example, the heat energy captured at the heat exchanger in contact with the hot first gas stream can be utilized for the generation of steam which is provided to the steam turbine.

(e) Waste Water Treatment

Residual contaminants in waste water resulting from any one or more of the trace removal, sour shift, ammonia removal, and/or catalyst recovery processes can be removed in a waste water treatment unit to allow recycling of the recovered water within the plant and/or disposal of the water from the plant process according to any methods known to those skilled in the art. Such residual contaminants can comprise, for example, phenols, CO, $CO_2$, $H_2S$, COS, HCN, ammonia, and mercury. For example, $H_2S$ and HCN can be removed by acidification of the waste water to a pH of about 3, treating the acidic waste water with an inert gas in a stripping column, increasing the pH to about 10 and treating the waste water a second time with an inert gas to remove ammonia (see U.S. Pat. No. 5,236,557). $H_2S$ can be removed by treating the waste water with an oxidant in the presence of residual coke particles to convert the $H_2S$ to insoluble sulfates which may be removed by flotation or filtration (see U.S. Pat. No. 4,478,425). Phenols can be removed by contacting the waste water with a carbonaceous char containing mono- and divalent basic inorganic compounds (e.g., the solid char product or the depleted char after catalyst recovery, supra) and adjusting the pH (see U.S. Pat. No. 4,113,615). Phenols can also be removed by extraction with an organic solvent followed by treatment of the waste water in a stripping column (see U.S. Pat. No. 3,972,693, U.S. Pat. No. 4,025,423 and U.S. Pat. No. 4,162,902).

(f) Multi-Train Processes

In the processes of the invention, each process may be performed in one or more processing units. For example, one or more catalytic gasifiers may be supplied with the carbonaceous feedstock from one or more catalyst loading and/or feedstock preparation unit operations. Similarly, the first gas streams generated by one or more catalytic gasifiers may be processed or purified separately or via their combination at a heat exchanger, sulfur-tolerant catalytic methanator, acid gas removal unit, trim methanator, and/or methane removal unit depending on the particular system configuration, as discussed, for example, in previously incorporated U.S. patent application Ser. Nos. 12/492,467, 12/492,477, 12/492,484, 12/492,489 and 12/492,497.

In certain embodiments, the processes utilize two or more catalytic gasifiers (e.g., 2-4 catalytic gasifiers). In such embodiments, the processes may contain divergent processing units (i.e., less than the total number of catalytic gasifiers) prior to the catalytic gasifiers for ultimately providing the catalyzed carbonaceous feedstock to the plurality of catalytic gasifiers and/or convergent processing units (i.e., less than the total number of catalytic gasifiers) following the catalytic gasifiers for processing the plurality of second gas streams generated by the plurality of catalytic gasifiers.

For example, the processes may utilize (i) divergent catalyst loading units to provide the catalyzed carbonaceous feedstock to the catalytic gasifiers; (ii) divergent carbonaceous materials processing units to provide a carbonaceous particulate to the catalyst loading units; (iii) convergent heat exchangers to accept a plurality of first gas streams from the catalytic gasifiers; (iv) convergent sulfur-tolerant methanators to accept a plurality of cooled first gas streams from the heat exchangers; (v) convergent acid gas removal units to accept a plurality of cooled first gas streams from the heat exchangers or methane-enriched first gas streams from the sulfur-tolerant methanators, when present; or (vi) convergent catalytic methanators or trim methanators to accept a plurality of second gas streams from acid gas removal units.

When the systems contain convergent processing units, each of the convergent processing units can be selected to have a capacity to accept greater than a 1/n portion of the total gas stream feeding the convergent processing units, where n is the number of convergent processing units. For example, in a process utilizing 4 catalytic gasifiers and 2 heat exchangers for accepting the 4 second gas streams from the catalytic gasifiers, the heat exchanges can be selected to have a capacity to accept greater than ½ of the total gas volume (e.g., ½ to ¾) of the 4 second gas streams and be in communication with two or more of the catalytic gasifiers to allow for routine maintenance of the one or more of the heat exchangers without the need to shut down the entire processing system.

Similarly, when the systems contain divergent processing units, each of the divergent processing units can be selected to have a capacity to accept greater than a 1/m portion of the total feed stream supplying the convergent processing units, where m is the number of divergent processing units. For example, in a process utilizing 2 catalyst loading units and a single carbonaceous material processing unit for providing the carbonaceous particulate to the catalyst loading units, the catalyst loading units, each in communication with the carbonaceous material processing unit, can be selected to have a capacity to accept ½ to all of the total volume of carbonaceous particulate from the single carbonaceous material processing unit to allow for routine maintenance of one of the catalyst loading units without the need to shut down the entire processing system.

We claim:

1. A process for preparing a substantially free-flowing alkali metal gasification catalyst-loaded carbonaceous particulate from a carbonaceous feedstock, the process comprising the steps of:
    (A) providing a carbonaceous feedstock having an initial moisture content;
    (B) grinding the carbonaceous feedstock;
    (C) classifying the carbonaceous feedstock from step (B) to a specified particle size profile to produce a carbonaceous particulate;
    (D) contacting the carbonaceous particulate with an amount of an aqueous solution comprising a concentration of an alkali metal gasification catalyst, to form an alkali metal gasification catalyst-loaded carbonaceous particulate wet cake having a specified ratio of alkali metal atoms to carbon atoms and a second moisture content; and
    (E) thermally treating the alkali metal gasification catalyst-loaded carbonaceous particulate wet cake as required to reduce the second moisture content to produce the alkali metal gasification catalyst-loaded carbonaceous particulate as a substantially free-flowing particulate, wherein:
    (a) the specified particle size profile has a d5 particle size of at least about 20 microns, a d95 particle size of about 1000 microns or less, and a d50 particle size ranging from about 75 to about 350 microns;
    (b) the specified ratio of alkali metal atoms to carbon atoms of step (D) is sufficient to provide an alkali metal atoms to carbon atoms ratio in the substantially free-flowing alkali metal gasification catalyst-loaded carbonaceous particulate of from about 0.01 to about 0.10;
    (c) the amount of aqueous solution and the concentration of the alkali metal gasification catalyst in step (D) are sufficient to provide the specified ratio of alkali metal atoms to carbon atoms in the alkali metal gasification catalyst-loaded carbonaceous particulate wet cake,
    (d) the alkali metal gasification catalyst-loaded carbonaceous particulate wet cake resulting from step (D) is substantially non-draining;
    (e) the contacting in step (D) takes place at substantially atmospheric pressure, and at an elevated temperature substantially at or below the boiling point of the aqueous solution, under agitation and for a specified amount of time, each of which is in an amount sufficient in combination to allow substantially even distribution of the alkali metal gasification catalyst within the non-draining alkali metal gasification catalyst-loaded carbonaceous particulate wet cake; and
    (f) the non-draining alkali metal gasification catalyst loaded carbonaceous particulate wet cake exits step (D) at a first temperature, and is passed into the thermal treating step (E) at substantially the same temperature.

2. The process according to claim 1, wherein the grinding step (B) is a dry grinding step.

3. The process according to claim 2, wherein the initial moisture content of the carbonaceous feedstock is reduced so that, when taking into account the amount of aqueous solution used in step (D), the wet cake resulting from step (D) is substantially non-draining.

4. The process according to claim 3, wherein the carbonaceous feedstock is dried concurrently with dry grinding.

5. The process according to claim 1, wherein the grinding step (B) is a wet grinding step that results in a wet ground carbonaceous feedstock.

6. The process of claim 5, where the moisture content of the wet ground carbonaceous feedstock is reduced so that, when taking into account the amount of aqueous solution used in step (D), the wet cake resulting from step (D) is substantially non-draining.

7. The process according to claim 1, wherein the carbonaceous feedstock comprises one or more of an anthracite, bituminous coal, sub-bituminous coal, lignite, petroleum coke or biomass.

8. The process according to 1, wherein the alkali metal comprises potassium, sodium or both.

9. The process according to claim 1, wherein the wet cake is non-draining.

10. The process according to claim 1, wherein the contacting of step (D) is performed at a temperature of from about 80° C. and about 100° C.

11. The process according to claim 1, wherein the contacting of step (D) takes place for a period of time ranging from about 5 minutes to about 60 minutes.

* * * * *